(12) United States Patent
Koo et al.

(10) Patent No.: US 9,882,195 B2
(45) Date of Patent: Jan. 30, 2018

(54) SECONDARY BATTERY AND METHOD FOR MANUFACTURING THE SAME

(71) Applicant: SAMSUNG SDI CO., LTD., Yongin-si, Gyeonggi-do (KR)

(72) Inventors: Minseok Koo, Yongin-si (KR);
Hyunyoung Lim, Yongin-si (KR);
Hyunsoo Lee, Yongin-si (KR);
Janghyun Song, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 0 days.

(21) Appl. No.: 15/180,112

(22) Filed: Jun. 13, 2016

(65) Prior Publication Data
US 2017/0149042 A1    May 25, 2017

(30) Foreign Application Priority Data

Nov. 24, 2015 (KR) ........................ 10-2015-0164901

(51) Int. Cl.
*H01M 2/04* (2006.01)
*H01M 2/06* (2006.01)
*H01M 2/30* (2006.01)

(52) U.S. Cl.
CPC ............. *H01M 2/30* (2013.01); *H01M 2/04* (2013.01); *H01M 2/06* (2013.01); *H01M 2220/20* (2013.01); *H01M 2220/30* (2013.01)

(58) Field of Classification Search
CPC ............ H01M 2/30; H01M 2/04; H01M 2/06; H01M 2/024; H01M 2/043; H01M 10/0413
See application file for complete search history.

(56) References Cited

U.S. PATENT DOCUMENTS

2011/0311863 A1* 12/2011 Byun .................. H01M 2/06
429/181
2012/0141845 A1    6/2012 Byun et al.
2012/0328932 A1* 12/2012 Guen ................. H01M 2/024
429/179

FOREIGN PATENT DOCUMENTS

| JP | 2009-259524 A | 11/2009 |
|----|---------------|---------|
| JP | 2015-106501 A | 6/2015 |
| KR | 10-2012-0060724 A | 6/2012 |
| WO | WO 2010/134155 A1 | 11/2010 |

* cited by examiner

*Primary Examiner* — Brittany Raymond
(74) *Attorney, Agent, or Firm* — Lee & Morse, P.C.

(57) ABSTRACT

A secondary battery and a method for manufacturing a secondary battery, the battery including a case having an internal space; an electrode assembly in the case, the electrode assembly including a first electrode plate, a second electrode plate, and a separator; a cap plate coupled with the case and sealing the case; and an electrode terminal part passing through the cap plate, the electrode terminal part including electrode terminals and a terminal plate, wherein the electrode terminal and the terminal plate are made of different materials are coupled to each other by riveting.

11 Claims, 5 Drawing Sheets

SECONDARY BATTERY AND METHOD FOR MANUFACTURING THE SAME

CROSS-REFERENCE TO RELATED APPLICATION

Korean Patent Application No. 10-2015-0164901, filed on Nov. 24, 2015, in the Korean Intellectual Property Office, and entitled: "Secondary Battery and Method for Manufacturing the Same," is incorporated by reference herein in its entirety.

BACKGROUND

1. Field

Embodiments relate to a secondary battery and a method for manufacturing the same.

2. Description of the Related Art

In general, unlike primary batteries which cannot be recharged, secondary batteries can be repeatedly charged and discharged. Low capacity batteries that use single battery cells packaged in packs may be used as power sources for various small portable electronic devices such as cellular phones, and camcorders. High capacity batteries that use tens of battery cells connected to each other in a battery pack may be used as power sources for driving motors of electric bicycles, electric scooters, hybrid vehicles, and electric vehicles.

Secondary batteries may be manufactured in various shapes, including a prismatic shape, a cylinder shape, or a pouch shape. The secondary battery may be fabricated by forming an electrode assembly having a separator (as an insulator) between a positive electrode plate and a negative electrode plate, accommodating the fabricated electrode assembly and an electrolyte in a case, and installing a cap assembly in the case. In addition, current collectors, electrode terminals, etc. are connected to the electrode assembly and are exposed or protruded to the outside through the cap plate.

SUMMARY

Embodiments are directed to a secondary battery and a method for manufacturing the same.

The embodiments may be realized by providing a secondary battery including a case having an internal space; an electrode assembly in the case, the electrode assembly including a first electrode plate, a second electrode plate, and a separator; a cap plate coupled with the case and sealing the case; and an electrode terminal part passing through the cap plate, the electrode terminal part including electrode terminals and a terminal plate, wherein the electrode terminal and the terminal plate are made of different materials are coupled to each other by riveting.

The electrode terminal may be made of copper and the terminal plate is made of aluminum.

The electrode terminal may have a rivet groove therein, and the electrode terminal part may include a rivet pin pressingly inserted into the rivet groove to rivet-couple the electrode terminal to the terminal plate.

A sidewall of the rivet groove may have an inner diameter that decreases as a depth of the rivet groove increases, and the rivet pin may have a protruding shape that corresponds to the inner diameter of the sidewall.

The rivet groove may have a tapered shape that narrows as a depth thereof increases, the rivet pin may have a tapered shape that narrows along a protruding direction thereof, the rivet pin being larger than the rivet groove such that the electrode terminal is deformed when the rivet pin is pressingly inserted into the rivet groove.

The rivet pin may be made of copper, stainless steel (SUS), or a nickel-iron alloy.

The rivet pin may include a main body and a stopper portion, the terminal plate may include an electrode terminal hole having a first step portion proximate to the cap plate and a second step portion distal to the cap plate, and the stopper portion of the rivet pin may be coupled to the first step portion.

An outer end of the stopper portion may be a first distance from the cap plate, the second step portion may be a second distance from the cap plate, and the first distance may be smaller than the second distance.

The rivet pin may include a main body and a stopper portion, the terminal plate may include an electrode terminal hole having a first step portion proximate to the cap plate and a second step portion distal to the cap plate, and the stopper portion of the rivet pin may be coupled to the second step portion.

An outer end of the stopper portion may be a first distance from the cap plate an outer end of the terminal plate may be a second distance from the cap plate, and the first distance may be smaller than the second distance.

The embodiments may be realized by providing a method for manufacturing a secondary battery, the method including coupling a current collector to an electrode assembly and inserting the electrode assembly into a case; coupling an electrode terminal to the current collector; sealing the case with a cap plate; and rivet-coupling the electrode terminal to a terminal plate, wherein rivet-coupling the electrode terminal to the terminal plate includes coupling the terminal plate with the cap plate from which the electrode terminal is protruded, and pressingly inserting a rivet pin into a rivet groove on an outer end of the electrode terminal.

BRIEF DESCRIPTION OF THE DRAWINGS

Features will be apparent to those of skill in the art by describing in detail exemplary embodiments with reference to the attached drawings in which.

DETAILED DESCRIPTION

Figure 1:
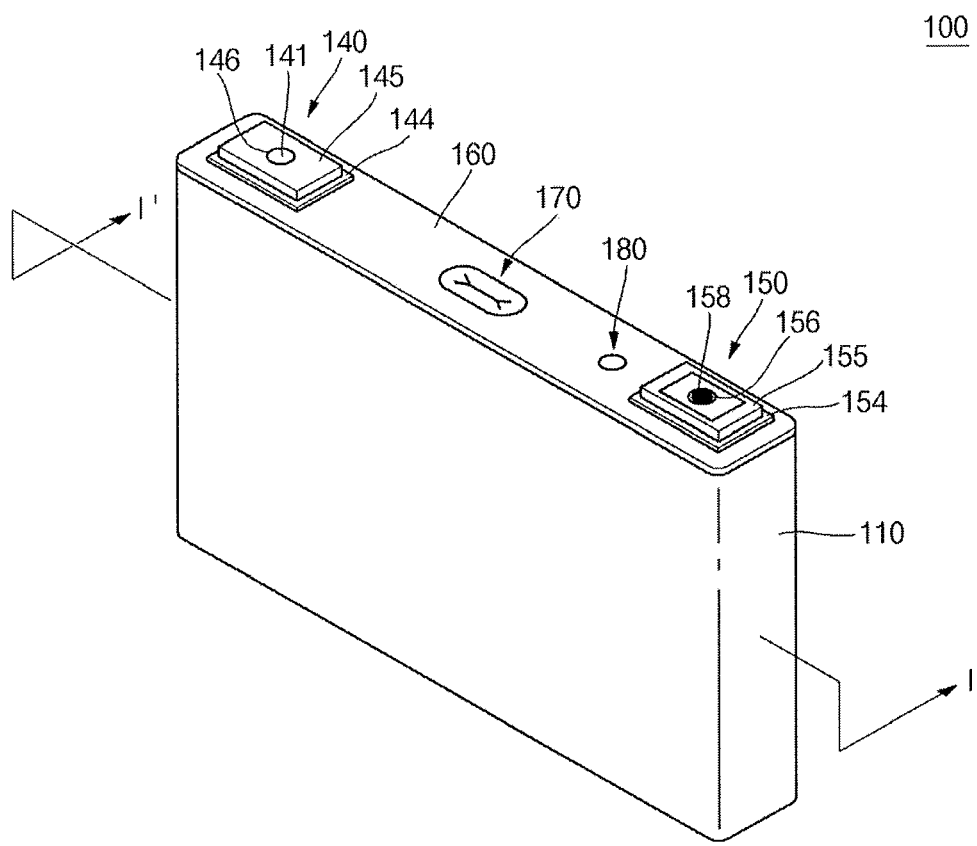
FIG. 1 illustrates a perspective view of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or element, it can be directly on the other layer or element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

As used herein, the term "and/or" includes any and all combinations of one or more of the associated listed items. It will also be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting. As used herein, the singular forms are intended to include the plural forms as well, unless the context clearly indicates otherwise. It will be further understood that the terms comprise or include and/or comprising or including when used in this specification, specify the presence of stated features, integers, steps, operations, elements, and/or components, but do not preclude the presence or addition of one or more other features, integers, steps, operations, elements, components, and/or groups thereof. The term "or" is not an exclusive term, e.g., A or B would also include A and b.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 2:
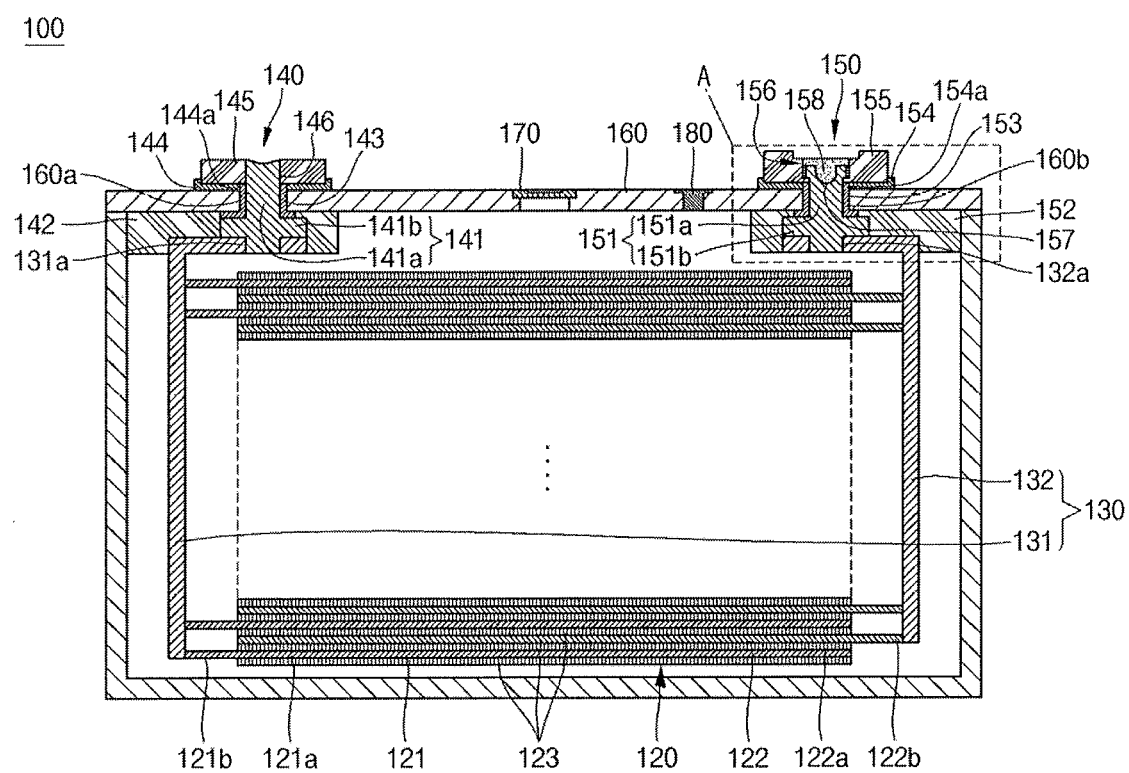
FIG. 2 illustrates a cross-sectional view of the secondary battery taken along the line I-I' of FIG. 1.
Figure 3:
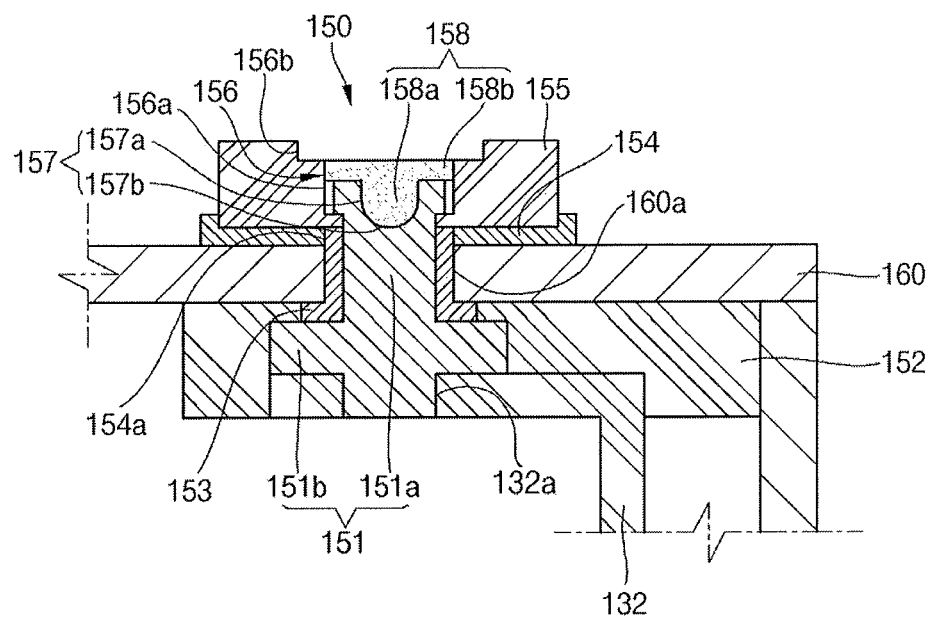
FIG. 3 illustrates an enlarged a cross-sectional view of a portion 'A' of FIG. 2.

FIG. 1 illustrates a perspective view of a secondary battery according to an embodiment, FIG. 2 illustrates a cross-sectional view of the secondary battery taken along the line I-I' of FIG. 1, and FIG. 3 illustrates an enlarged a cross-sectional view of a portion 'A' of FIG. 2.

Referring to FIGS. 1 and 2, the secondary battery 100 according to an embodiment may include a case 110, an electrode assembly 120, a current collector 130, a first electrode terminal unit 140, a second electrode terminal unit 150, a cap plate 160, a safety vent 170, and an electrolyte injection unit 180.

The case 110 may be roughly shaped of a hexahedron having an opening in or through which the electrode assembly 120 is inserted and placed. The case 110 has an inner space at the opening to accommodate the electrode assembly 120 and an electrolyte solution. The case 110 may be made of a metal, such as aluminum or an aluminum alloy. The electrolyte solution may include a lithium salt dissolved in an organic solvent and may exist in a liquid, solid, or gel phase.

The electrode assembly 120 may be inserted into the case 110 and may include a first electrode plate 121, a second electrode plate 122, and a separator 123 interposed therebetween. In an implementation, the electrode assembly 120 may be formed in a jelly-roll configuration by winding a stacked structure of the first electrode plate 121, the second electrode plate 122 and the separator 123. The first electrode plate 121 may serve as a positive electrode and the second electrode plate 122 may serve as a negative electrode having an opposite polarity to the first electrode plate 121. The electrode assembly 120 may include a stacked structure including a plurality of electrode plates 121 and 122 and a plurality of separators 123. In an implementation, the first electrode plate 121 may serve as a negative electrode and the second electrode plate 122 may serve as a positive electrode.

The first electrode plate 121 and the second electrode plate 122 may include coated portions 121a and 122a having active materials coated on current collectors formed of metal plates, and uncoated portions 121b and 122b formed of exposed current collectors without active materials coated thereon. The uncoated portions 121b and 122b may be formed at opposite ends of the (e.g., wound) first and second electrode plates 121 and 122 and may become paths of current flowing between each of the first and second electrode plates 121 and 122 and the outside.

The first electrode plate 121 as a positive electrode may be formed of a metal foil, such as an aluminum foil, and the active material having lithium-based oxide as a main component may be coated on opposite surfaces of the coated portion 121a of the first electrode plate 121.

The second electrode plate 122 as a negative electrode may be formed of a metal foil, such as a copper foil, and the active material having a carbonaceous material as a main component is coated on opposite surfaces of the coated portion 122a of the second electrode plate 122.

The separator 123 may be positioned between the first electrode plate 121 and the second electrode plate 122 to prevent a short-circuit therebetween. In an implementation, the separator 123 may be made of polyethylene, polypropylene or a copolymer of polyethylene and polypropylene.

The current collector 130 may include a first current collector 131 and a second current collector 132, which are bent in an 'L' shape.

The first current collector 131 may have one end extended in one direction from its bent portion to then be coupled and electrically connected to the uncoated portion 121b of the first electrode plate 121. In an implementation, the first current collector 131 may be coupled to the first electrode plate 121 by welding. In an implementation, a fastening hole 131a may be formed at the other end of the first current collector 131 extended in the other direction from the bent portion so as to be coupled to the first electrode terminal 141 of the first electrode terminal unit 140. The first current collector 131 may be made of a metal, such as aluminum or an aluminum alloy.

The second current collector 132 may have one end extended in one direction from its bent portion to then be coupled and electrically connected to the uncoated portion 122b of the second electrode plate 122. In an implementation, the second current collector 132 may be coupled to the second electrode plate 122 by welding. In an implementation, a fastening hole 132a may be formed at the other end of the second current collector 132 extended in the other direction from the bent portion so as to be coupled to the f second electrode terminal 151 of the second electrode terminal unit 150. The second current collector 132 may be made of a metal, such as copper or a copper alloy.

The first electrode terminal unit 140 may include a first electrode terminal 141, an insulation member 142, a gasket 143, a first fastening plate 144, and a first terminal plate 145.

The first electrode terminal 141 may include a body part 141a and a flange part 141b. The body part 141a may be cylinder-shaped and may pass through the cap plate 160 to then protrude to the outside. The flange part 141b may horizontally or laterally extend from a side portion of the body part 141a and may help prevent the first electrode terminal 141 from being dislodged from the cap plate 160. A region of the body part 141a formed under (e.g., inward relative to) the flange part 141b may be inserted into the fastening hole 131a of the first current collector 131 to then be coupled thereto, thereby electrically connecting the first electrode terminal 141 to the first current collector 131. The coupling may be performed by riveting or welding. In an implementation, a region of the body part 141a formed on (e.g., outward relative to) the flange part 141b may pass through the cap plate 160 to then be upwardly or outwardly extended and protrude a predetermined length. In an implementation, the first electrode terminal 141 may be made of a metal, such as aluminum or an aluminum alloy.

The insulation member 142 may be formed between the first current collector 131 and the cap plate 160 and may help an electric short-circuit therebetween.

The gasket 143 may be formed between the first electrode terminal 141 and the cap plate 160 using an insulating material and may seal a portion between the first electrode terminal 141 and the cap plate 160. The gasket 143 may help prevent external moisture from penetrating into the secondary battery 100 and/or may help prevent an electrolyte solution contained in the secondary battery 100 from flowing out.

The first fastening plate 144 may have a first electrode terminal hole 144a formed therein to allow the first electrode terminal 141 to pass therethrough. The first fastening plate 144 may be inserted onto the first electrode terminal 141 (that upwardly or outwardly protrudes from the cap plate 160) to then be coupled with a top portion of (e.g., outer side of) the cap plate 160.

The first terminal plate 145 may have a first electrode terminal hole 146 formed therein to allow the first electrode terminal 141 to pass therethrough. The first terminal plate 145 may be inserted onto the first electrode terminal 141 (that upwardly or outwardly protrudes from the cap plate 160) to then be coupled with a top portion or outer side of the first fastening plate 144. In an implementation, the first terminal plate 145 may be coupled with the outwardly protruding first electrode terminal 141 by riveting or welding. The first terminal plate 145 may be made of a metal, such as aluminum or an aluminum alloy.

The first terminal plate 145 may be electrically connected to the first electrode terminal 141. When the first fastening plate 144 is made of a conductive material, the first terminal plate 145 may be electrically connected to the cap plate 160 through the first fastening plate 144.

Referring to FIG. 3, the second electrode terminal unit 150 may include a second electrode terminal 151, an insulation member 152, a gasket 153, a second fastening plate 154, a second terminal plate 155, and a rivet pin 158.

The second electrode terminal 151 may include a body part 151a and a flange part 151b and may pass through the cap plate 160 to then be protruded to the outside. The body part 151a may be cylinder-shaped and may pass through the cap plate 160 to then be protruded to the outside. A top or outer end of the body part 151a may be bent to or into a first step portion 156a of the second terminal plate 155. A rivet groove 157 may be formed at the top or outer end of the body part 151a and may extend into an interior of the body part 151a. The flange part 151b may horizontally or laterally extend from a side portion of the body part 151a and may help prevent the second electrode terminal 151 from being dislodged from the cap plate 160. A region of the body part 151a under (e.g., in an inward direction relative to) the flange part 151b may be inserted into the fastening hole 132a of the second current collector 132 to then be coupled thereto, thereby electrically connecting the second electrode terminal 151 to the second current collector 132. The coupling may be performed by riveting or welding. In an implementation, a region of the body part 151a on (e.g., in an outward direction relative to) the flange part 151b may pass through the cap plate 160 to then be upwardly or outwardly extended and protruded a predetermined length. In an implementation, the second electrode terminal 151 may be made of a metal, such as copper or a copper alloy.

The insulation member 152 may be between the second current collector 132 and the cap plate 160 and may help prevent an electric short-circuit therebetween.

The gasket 153 may be between the second electrode terminal 151 and the cap plate 160, may include an insulating material, and may seal a portion or area between the second electrode terminal 151 and the cap plate 160. The gasket 153 may help prevent external moisture from penetrating into the secondary battery 100 and/or may help prevent an electrolyte solution contained in the secondary battery 100 from flowing out.

The second fastening plate 154 may have a second electrode terminal hole 154a formed therein to allow the second electrode terminal 151 to pass therethrough. The second fastening plate 154 may be inserted onto the second electrode terminal 151 (that upwardly or outwardly protrudes from the cap plate 160) to then be coupled to a top portion (e.g., outer side) of the cap plate 160.

The second terminal plate 155 may have a second electrode terminal hole 156 formed therein to allow the second electrode terminal 151 to pass therethrough. The second electrode terminal hole 156 may include a first step portion 156a and a second step portion 156b. The second terminal plate 155 may be inserted onto the second electrode terminal 151 (that upwardly or outwardly protrudes from the cap plate 160) to then be coupled with a top portion (e.g., outer side) of the second fastening plate 154. In an implementation, the second terminal plate 155 may be coupled with the outwardly protruding second electrode terminal 151 by riveting or welding. The second terminal plate 155 may be made of a different metal from that of the second electrode terminal 151. In an implementation, the second terminal plate 155 may be made of, e.g., aluminum or an aluminum alloy.

The second terminal plate 155 may be electrically connected to the second electrode terminal 151. If the cap plate 160 and the first electrode terminal 141 have the same polarity, the second fastening plate 154 may be made of an insulating material to electrically disconnect or isolate the second terminal plate 155 from the cap plate 160.

The rivet groove 157 may be formed at the top or outer end of the body part 151a of the first electrode terminal 151. In an implementation, the rivet groove 157, which may be a circular or rounded groove to allow the rivet pin 158 to be pressingly inserted into the rivet groove 157, may be formed in the body part 151a to have a predetermined depth. In an implementation, the rivet groove 157 may include a sidewall portion 157a and a bottom portion 157b. The sidewall portion 157a may have a substantially circular section. In an implementation, in order to facilitate insertion of the rivet pin 158 into the rivet groove 157, the sidewall portion 157a may have an inner diameter that, e.g., gradually or continuously, decreases as a depth of the rivet groove 157 increases. For example, the rivet groove 157 may be inwardly tapered. Like the inner diameter of a bottom end of the sidewall portion 157a, the bottom portion 157b may be circular or rounded.

The rivet pin 158 may be pressingly inserted into the rivet groove 157 to then rivet-couple the second electrode terminal 151 to the second terminal plate 155. The rivet pin 158 may include a main body 158a and a stopper portion 158b.

The main body 158a may have a protruding shaped and may conform with (e.g., may be substantially complementary to but slightly larger than) the rivet groove 157. For example, the main body 158a may have a substantially circular or rounded section. Like the sidewall portion 157a of the rivet groove 157, an outer diameter of the main body 158a may, e.g., gradually or continuously, decrease in a downward or inward direction. The stopper portion 158b may be cylinder-shaped, and an outer diameter of the cylinder may be larger than an inner diameter of a top or outer end of the sidewall portion 157a of the rivet groove 157. Therefore, a bottom or inner surface of the stopper portion 158b may be coupled with a top or outer end of the main body 151a of the second electrode terminal 151 to then be placed in the first step portion 156a of the second electrode terminal hole 156 of the second terminal plate 155. In an implementation, a top or outer surface of the stopper portion 158b may be formed at a lower position than the second step portion 156b of the second electrode terminal hole 156. For example, the rivet pin 158 and the second terminal plate 155 may have a structure such that the outer surface of the stopper portion 158b may be proximate to the cap plate 160 and the second step portion 156b may be distal to the cap plate 160 (e.g., relative to the outer surface of the stopper portion 158b). Therefore, when battery cells are connected, the outer end of the stopper portion 158b may not contact a bus bar. In an implementation, the rivet pin 158 may be made of or include, e.g., copper, stainless steel (SUS), or nickel-iron alloy (e.g., 64FeNi or Invar).

The cap plate 160 may be coupled to the case 110 to seal the opening of the case 110. The cap plate 160 may include a first electrode terminal hole 160a and a second electrode terminal hole 160b through which the first electrode terminal 141 and the second electrode terminal 151 are protruded, and may further include a safety vent 170 and an electrolyte injection unit 180.

The first electrode terminal hole 160a and the second electrode terminal hole 160b may have circular sections to allow the first electrode terminal 141 to pass therethrough.

The safety vent 170 may be positioned at the center of the cap plate 160. The safety vent 170 may be separate installed in a vent hole formed to pass through the cap plate 160 or may be integrally formed with the cap plate 160. When the internal pressure of the secondary battery rises due to, e.g., over-charge, the safety vent 170 may be ruptured, thereby preventing the secondary battery from exploding.

The electrolyte injection unit 180 may include an electrolyte injection hole and a plug. The electrolyte injection hole may facilitate injection of an electrolyte solution into the secondary battery 100 and may be sealed by the plug to prevent the electrolyte solution from leaking out.

In an implementation, the cap plate 160 may be made of the same material as the case 110.

The second electrode terminal may be made of a metal, such as copper or a copper alloy, and the second terminal plate may be made of a metal, such as aluminum or an aluminum alloy. The materials of the second electrode terminal and the second terminal plate may have different thermal expansion coefficients, so that the second electrode terminal and the second terminal plate may be decoupled from each other when the temperature of the secondary battery in use is raised. Therefore, the second electrode terminal and the second terminal plate made of different materials may be coupled to each other by welding, such as friction welding, electric resistance welding or ultrasonic welding. The welding employed for coupling the second electrode terminal to the second terminal plate may increase the manufacturing cost of the secondary battery.

In an implementation, in the second electrode terminal unit 150 of the secondary battery 100 according to an embodiment, the rivet pin 158 may be pressingly inserted into the rivet groove 157 to rivet-couple the second electrode terminal 151 to the second terminal plate 155, thereby stably coupling the second electrode terminal 151 to the second terminal plate 155 without direct welding. Therefore, the rivet-coupling may simplify the coupling process while maintaining a secured coupling force, thereby reducing the manufacturing cost of the secondary battery 100.

Hereinafter, a second electrode terminal unit 250 of a secondary battery according to another embodiment will be described.

Figure 4:
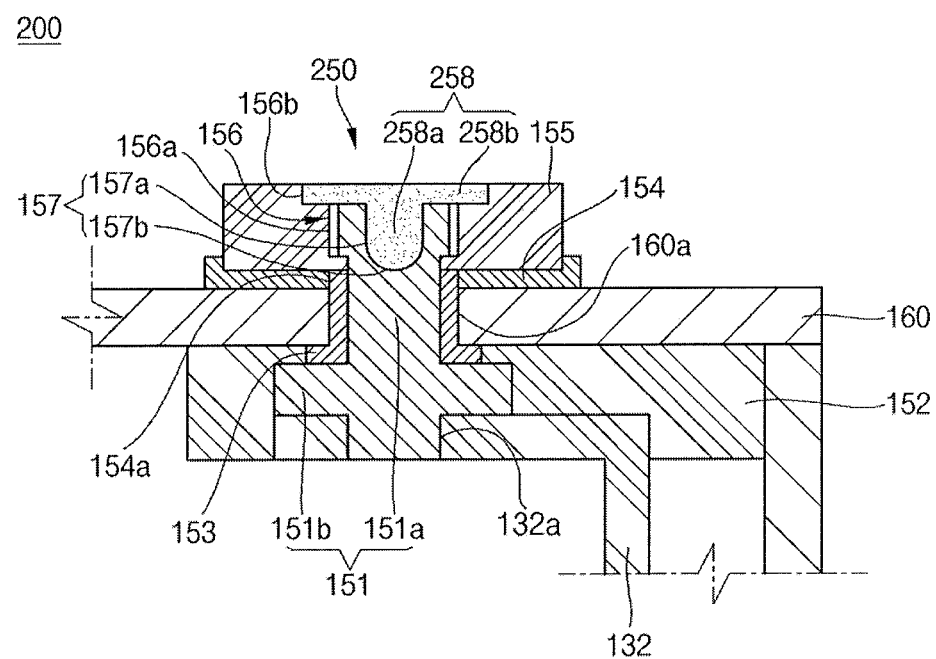
FIG. 4 illustrates a cross-sectional view of a second electrode assembly of a secondary battery according to another embodiment.

FIG. 4 illustrates a cross-sectional view of a second electrode assembly of a secondary battery according to another embodiment.

Referring to FIG. 4, the secondary battery 200 according to another embodiment may include a case 110, an electrode assembly 120, a current collector 130, a first electrode terminal unit 140, a second electrode terminal unit 250, a cap plate 160, a safety vent 170 and an electrolyte injection unit 180. In the present embodiment, the same functional element is denoted by the same reference numeral, and the following description will focus on differences between the present and previous embodiment.

The second electrode terminal unit 250 may include a second electrode terminal 151, an insulation member 152, a gasket 153, a second fastening plate 154, a second terminal plate 155, and a rivet pin 258.

The rivet pin 258 may be pressingly inserted into a rivet groove 157 to rivet-couple the second electrode terminal 151 to the second terminal plate 155, thereby stably coupling the second electrode terminal 151 to the second terminal plate 155. The rivet pin 158 may include a main body 258a and a stopper portion 258b.

The main body 258a may have a protruding shape so as to conform with the rivet groove 157, e.g., may have a shape that is substantially complementary to but slightly larger than that of the rivet groove 157. Accordingly, the main body 258a may have a substantially circular section. Like a sidewall portion 157a of the rivet groove 157, an outer diameter of the main body 258a may, e.g., gradually or continuously, decrease in a downward or inward direction, e.g., may have a tapered shape. The stopper portion 258b may be cylinder-shaped, and an outer diameter of the section of the cylinder may be larger than an outer diameter of a top or outer end of the sidewall portion 157a of the rivet groove 157. For example, the rivet part 258 may be coupled with the second terminal plate 155 by way of an interference fit. Therefore, a bottom or inner surface of the stopper portion 258b may be coupled with a top or outer end of the main body 151a of the second electrode terminal 151 to then be placed in a second step portion 156b of a second electrode terminal hole 156 of the second terminal plate 155. In an implementation, a top or outer surface of a stopper portion 258b may be formed at a lower position than an outer surface of the second terminal plate 155 or the cap plate 160. Therefore, when battery cells are connected, the outer end of the stopper portion 258b may not be brought into contact with a bus bar. In an implementation, the rivet pin 258 may be made of, e.g., copper, stainless steel (SUS), or nickel-iron alloy (e.g., 64FeNi or Invar).

According to another embodiment, the stopper portion 258b of the rivet pin 258 may be brought into contact with the second step portion 156b of the second electrode terminal hole 156 of the second terminal plate 155, thereby more stably coupling the rivet pin 258 to the rivet groove 157.

Hereinafter, a method for manufacturing a secondary battery according to an embodiment will be described.

Figure 5:
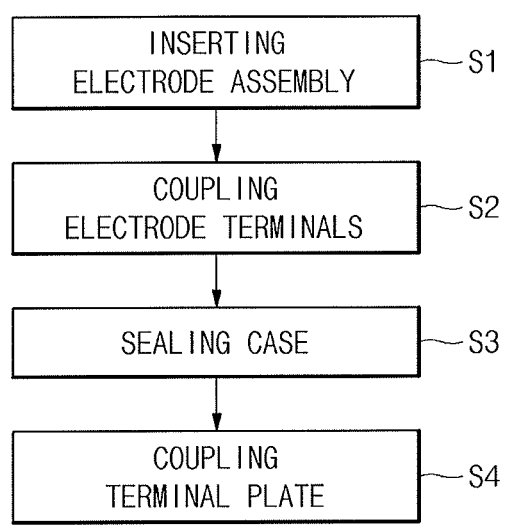
FIG. 5 illustrates a flowchart for explaining a method for manufacturing a secondary battery according to an embodiment.
Figure 6A:
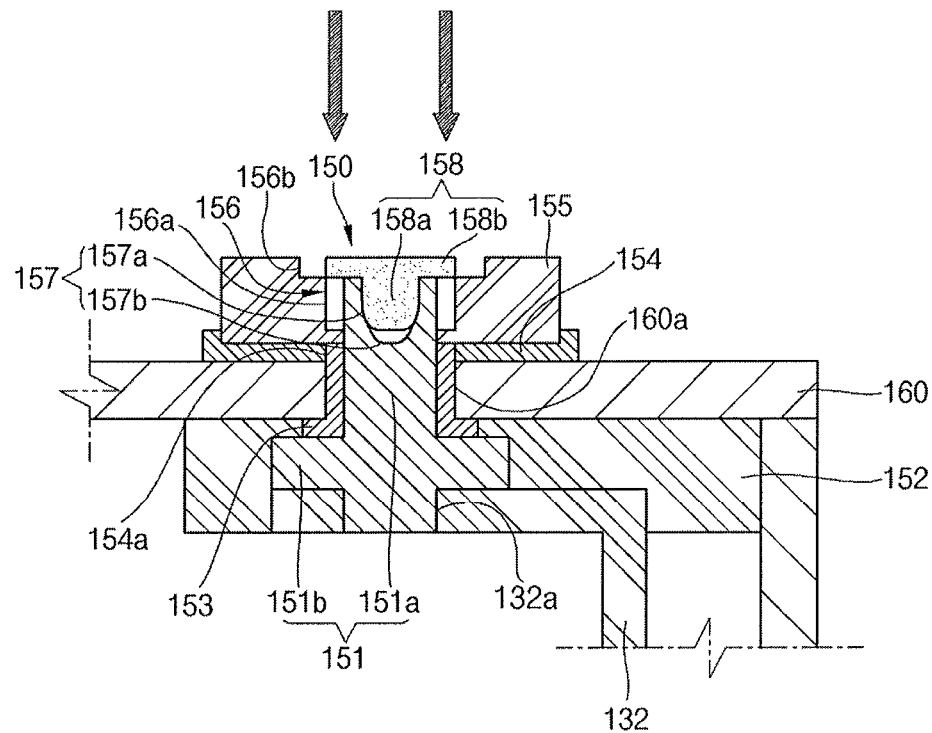
FIG. 6A illustrates a cross-sectional view of a state of a secondary battery according to an embodiment before a rivet pin is riveted to a second electrode terminal.
Figure 6B:
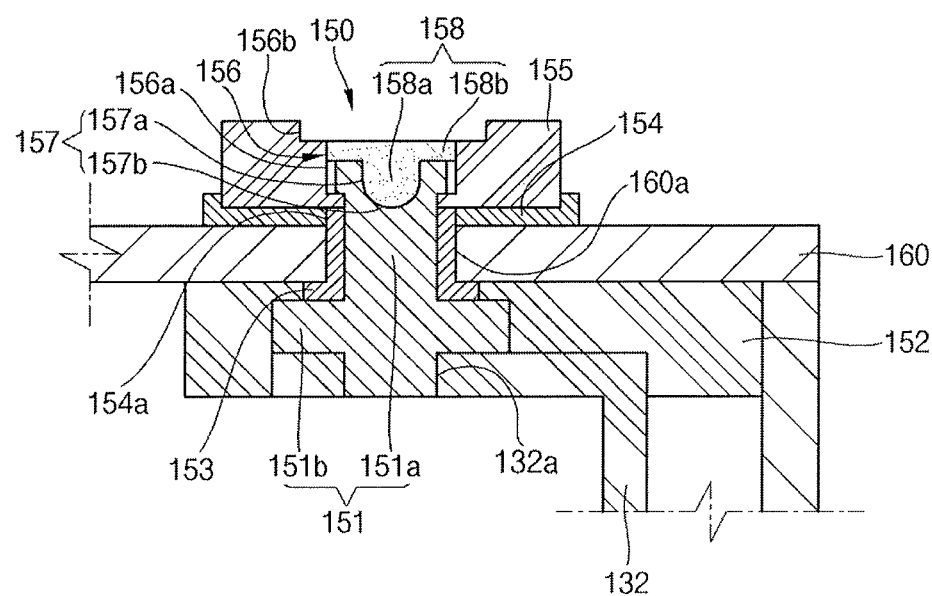
FIG. 6B illustrates a cross-sectional view of a state of a secondary battery according to an embodiment after a rivet pin is riveted to a second electrode terminal.

FIG. 5 illustrates a flowchart for explaining a method for manufacturing a secondary battery according to an embodiment of the present invention, FIG. 6A illustrates a cross-sectional view of a state of a secondary battery according to an embodiment before a rivet pin is riveted to a second electrode terminal, and FIG. 6B illustrates a cross-sectional view of a state of a secondary battery according to an embodiment after a rivet pin is riveted to a second electrode terminal.

Referring to FIG. 5, the method for manufacturing a secondary battery according to an embodiment may include inserting the electrode assembly into the case (S1); coupling the electrode terminals to the electrode assembly (S2); sealing the case with the cap plate (S3); and coupling the terminal plate (S4).

Referring to FIGS. 6A and 6B, in the inserting of the electrode assembly into the case (S1), the electrode assembly 120 may be, e.g., formed by winding or stacking the first electrode plate 121, the second electrode plate 122 and the separator 123, and the current collectors 131 and 132 are coupled to the uncoated portions 121b and 122b of the formed electrode assembly 120. Then, the electrode assembly 120 having the current collectors 131 and 132 coupled thereto is inserted into the case 110.

In the coupling of the electrode terminals to the electrode assembly (S2), the electrode terminals 141 and 151, the insulation members 142 and 152 and the gaskets 143 and 153 are coupled to the current collectors 131 and 132.

In the sealing of the case with the cap plate (S3). the cap plate 160 is coupled to the top portion of the case 110 to allow the electrode terminals 141 and 151 to protrude from the electrode terminal holes 160a and 160b, thereby sealing the case 110.

In the coupling of the terminal plate (S4), the fastening plates 144 and 154 may be coupled to top portions or outer sides of the cap plate 160 to allow the electrode terminals 141 and 151 to pass through the electrode terminal holes 144a and 154a.

The first terminal plate 145 may be coupled to a top or outer portion of the first fastening plate 144 to allow the first electrode terminal 141 to pass through the first electrode terminal hole 146. In addition, the first electrode terminal 141 may be coupled to the first terminal plate 145 by riveting or welding.

The second terminal plate 155 may be coupled to a top or outer portion of the second fastening plate 154 to allow the second electrode terminal 151 to pass through the second electrode terminal hole 156. Then, pressure may be applied to the rivet pin 158 in a direction indicated by arrows, so that the rivet pin 158 is pressingly inserted into the rivet groove 157. If the rivet pin 158 is pressingly inserted into the rivet groove 157, the rivet groove 157 may have a transformed shape, and a top end of the second electrode terminal 151 may be bent to or in the first step portion 156a of the second electrode terminal hole 156 of the second terminal plate 155, thereby rivet-coupling the second electrode terminal 151 to the second terminal plate 155. To achieve the rivet-coupling, the outer diameter of the main body 158a of the rivet pin 158 after the rivet pin 158 is coupled to the second electrode terminal 151 may be larger than the inner diameter (e.g., at the sidewall portion 157a) of the rivet groove 157 before the rivet pin 158 is coupled to the second electrode terminal 151.

Therefore, according to the method for manufacturing the secondary battery 100, the second electrode terminal 151 may be be stably rivet-coupled to the second terminal plate 155 without direct coupling.

By way of summation and review, stable coupling of components of the electrode terminals protruded to or from the cap plate in the secondary battery has been considered. A structure and method of providing a stable coupling mechanism of the electrode assembly may be desirable.

As described above, in the secondary battery and the method for manufacturing the same according to an embodiment, rivet pins may be pressingly inserted into top portions of the electrode terminals and then riveted, thereby forming a stable coupling structure even without directly welding the electrode terminals with a terminal plate.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
   a case having an internal space;
   an electrode assembly in the case, the electrode assembly including a first electrode plate, a second electrode plate, and a separator;
   a cap plate coupled with the case and sealing the case; and
   an electrode terminal part passing through the cap plate, the electrode terminal part including an electrode terminal and a terminal plate, the electrode terminal having a rivet groove therein, wherein the electrode terminal and the terminal plate are made of different materials are coupled to each other by riveting, and wherein the electrode terminal part includes a rivet pin pressingly inserted into the rivet groove to rivet-couple the electrode terminal to the terminal plate.

2. The secondary battery as claimed in claim 1, wherein the electrode terminal is made of copper and the terminal plate is made of aluminum.

3. The secondary battery as claimed in claim 1, wherein:
a sidewall of the rivet groove has an inner diameter that decreases as a depth of the rivet groove increases, and
the rivet pin has a protruding shape that corresponds to the inner diameter of the sidewall.

4. The secondary battery as claimed in claim 1, wherein:
the rivet groove has a tapered shape that narrows as a depth thereof increases,
the rivet pin has a tapered shape that narrows along a protruding direction thereof, the rivet pin being larger than the rivet groove such that the electrode terminal is deformed when the rivet pin is pressingly inserted into the rivet groove.

5. The secondary battery as claimed in claim 1, wherein the rivet pin is made of copper, stainless steel (SUS), or a nickel-iron alloy.

6. The secondary battery as claimed in claim 1, wherein:
the rivet pin includes a main body and a stopper portion,
the terminal plate includes an electrode terminal hole having a first step portion proximate to the cap plate and a second step portion distal to the cap plate, and
the stopper portion of the rivet pin is coupled to the first step portion.

7. The secondary battery as claimed in claim 6, wherein:
an outer end of the stopper portion is a first distance from the cap plate,
the second step portion is a second distance from the cap plate, and
the first distance is smaller than the second distance.

8. The secondary battery as claimed in claim 1, wherein:
the rivet pin includes a main body and a stopper portion,
the terminal plate includes an electrode terminal hole having a first step portion proximate to the cap plate and a second step portion distal to the cap plate, and
the stopper portion of the rivet pin is coupled to the second step portion.

9. The secondary battery as claimed in claim 8, wherein:
an outer end of the stopper portion is a first distance from the cap plate an outer end of the terminal plate is a second distance from the cap plate, and
the first distance is smaller than the second distance.

10. A secondary battery, comprising:
a case having an internal space;
an electrode assembly in the case, the electrode assembly including a first electrode plate, a second electrode plate, and a separator;
a cap plate coupled with the case and sealing the case; and
an electrode terminal part passing through the cap plate, the electrode terminal part including electrode terminals and a terminal plate,
wherein:
the electrode terminal and the terminal plate are made of different materials are coupled to each other by riveting,
the electrode terminal has a rivet groove therein,
the electrode terminal part includes a rivet pin pressingly inserted into the rivet groove to rivet-couple the electrode terminal to the terminal plate,
the rivet pin includes a main body and a stopper portion,
the terminal plate includes an electrode terminal hole having a first step portion proximate to the cap plate and a second step portion distal to the cap plate, and
the stopper portion of the rivet pin is coupled to the first step portion.

11. A secondary battery, comprising:
a case having an internal space;
an electrode assembly in the case, the electrode assembly including a first electrode plate, a second electrode plate, and a separator;
a cap plate coupled with the case and sealing the case; and
an electrode terminal part passing through the cap plate, the electrode terminal part including electrode terminals and a terminal plate,
wherein:
the electrode terminal and the terminal plate are made of different materials are coupled to each other by riveting,
the electrode terminal has a rivet groove therein,
the electrode terminal part includes a rivet pin pressingly inserted into the rivet groove to rivet-couple the electrode terminal to the terminal plate,
the rivet pin includes a main body and a stopper portion,
the terminal plate includes an electrode terminal hole having a first step portion proximate to the cap plate and a second step portion distal to the cap plate, and
the stopper portion of the rivet pin is coupled to the second step portion.

* * * * *